June 28, 1960     W. M. WISGIRDA     2,942,918
SELF-ALIGNING BEARING STRUCTURE
Filed Nov. 4, 1957
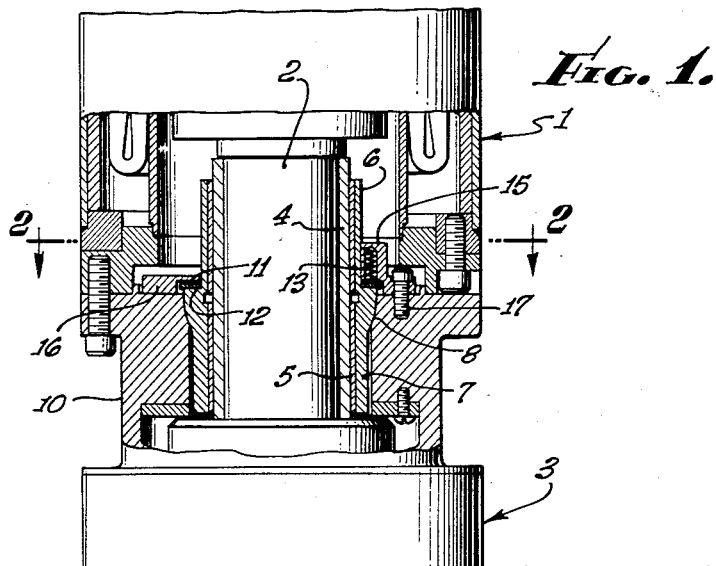
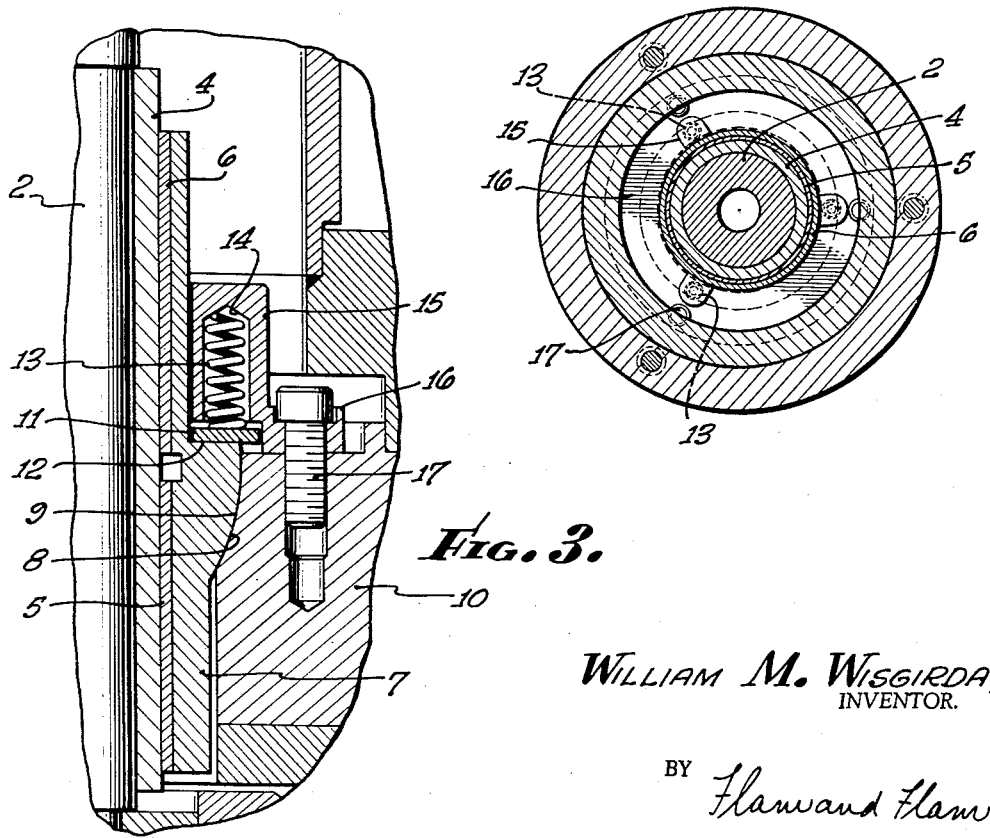
WILLIAM M. WISGIRDA,
INVENTOR.
BY
ATTORNEYS

United States Patent Office 2,942,918
Patented June 28, 1960

2,942,918
SELF-ALIGNING BEARING STRUCTURE

William M. Wisgirda, Glendale, Calif., assignor to U.S. Electrical Motors, Inc., Los Angeles, Calif., a corporation of California Filed Nov. 4, 1957, Ser. No. 694,282

1 Claim. (Cl. 308—72)

This invention relates to bearing structures, and especially to bearing structures utilized for submersible electric motors.

Such structures are commonly used in connection with vertical shafts, as for example in vertical electric motors. It has been proposed to use a spherical seat for the member that supports the bearings, whereby axial alignment between the bearing and the shaft is maintained even when the axis of the shaft moves away from the vertical.

It is one of the objects of this invention to improve, in general, such self-aligning bearing structures.

In structures of this character, the spherical contacting surfaces are apt to wear, creating an undesirable looseness between these surfaces.

It is another object of this invention to compensate for such looseness, thus ensuring that the contacting surfaces will remain accurately mated.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claim.

Referring to the drawings:

Figure 1 is a fragmentary elevational view of an electric motor having a shaft, supported by an embodiment of the invention, some of the parts being in vertical section;

Fig. 2 is a sectional view, taken along a plane corresponding to line 2—2 of Fig. 1; and Fig. 3 is an enlarged fragmentary longitudinal sectional view of the bearing structure illustrated in Figs. 1 and 2.

The present invention is shown as incorporated in a submersible motor structure including a casing 1. A motor shaft 2 is accommodated by the casing. A lower casing structure 3 is intended to provide a thrust bearing structure for the shaft. This lower casing structure is joined to casing 1 by the aid of a head 10.

The shaft 2 is shown in this instance as carrying a stainless steel sleeve 4 that cooperates with a pair of babbitt sleeves 5 and 6. These babbitt sleeves are formed as a lining of a bearing supporting structure 7. This bearing supporting structure is of sleeve form. Intermediate its length it has an exterior convex curvilinear surface 8 formed as a zone of a sphere. This curvilinear surface cooperates with a concavity 9, also formed of a corresponding spherical mating surface. This concave surface 9 is formed integrally upon the head 10.

By virtue of the mating surfaces 8 and 9, the shaft 2 can be misaligned with the axis of the motor, and yet the bearing structure will accommodate itself to the misaligned shaft. This misalignment may cause wear between the surfaces 8 and 9, causing play or looseness. This in turn may cause unusually rapid wear and also causes undesirable vibrations.

In order to eliminate this looseness, resilient means are provided for urging the two mating spherical surfaces 8 and 9 toward each other. For this purpose, use is made of a ring 11 which is disposed on a shoulder or annular surface 12 formed on the member 7. This annular surface 12 is normal to the axis of the shaft 2.

Urging the ring 11 downwardly are a number of compression springs 13, three being shown in the present instance. These springs are retained in recesses 14 (three being shown) and formed within bosses 15. These bosses 15 are formed integrally with a flange ring 16. This ring 16 is attached to the head 10 by the aid of a number of machine screws 17. The upper plane surface of the head 10 is parallel to and disposed below the plane surface 12 so as to permit relative movement between the members 7 and 10.

The compression springs 13 are sufficiently strong to ensure against any accidental displacement between the surfaces 8 and 9. All wear is taken up by the action of these springs upon the ring 12. Minor misalignment of the axis of the shaft does not interfere with the action of the springs 13.

The inventor claims:

In a bearing structure: a stationary support having a concave seat surface corresponding to a spherical zone; means forming a cylindrical non-rotary bearing surface along an axis intersecting the axis of the zone; said means having a convex spherical surface seated in the concave surface and mating therein, said means having a first plane surface normal to the axis of the cylindrical surface and forming a shoulder at the end of the convex surface, said shoulder being intermediate the ends of the cylindrical surface; said support having a second plane surface normal to said axis of the cylindrical surface and forming an edge for the concave surface; said plane surfaces being axially spaced so that the convex spherical surface extends beyond the second plane surface; a first ring supported on the shoulder; a second ring supported on the said second plane surface, and having a plurality of recesses directed toward the first ring; and a spring in each recess for urging the first ring against said shoulder; said axial spacing being sufficient to permit limited freedom of movement of the means that forms the cylindrical bearing surface.

References Cited in the file of this patent

UNITED STATES PATENTS

| | | |
|---|---|---|
| 1,067,892 | Walters | July 22, 1913 |
| 1,787,459 | Tawresey | Jan. 6, 1931 |
| 2,012,997 | Junkers | Sept. 3, 1935 |
| 2,019,569 | Justeson | Nov. 5, 1935 |
| 2,270,392 | Talmidge et al. | Jan. 20, 1942 |

FOREIGN PATENTS

| | | |
|---|---|---|
| 385,143 | France | Feb. 29, 1908 |
| 589,417 | Great Britain | June 19, 1947 |
| 715,965 | Great Britain | Sept. 22, 1954 |
| 1,010,334 | Germany | June 13, 1957 |